United States Patent [19]

Kotani et al.

[11] 4,302,361

[45] Nov. 24, 1981

[54] PRESSURE SENSITIVE CONDUCTOR

[75] Inventors: Teizo Kotani; Masaki Nagato; Kozo Arai, all of Yokohama, Japan

[73] Assignee: Japan Synthetic Rubber Co., Ltd., Tokyo, Japan

[21] Appl. No.: 15,485

[22] Filed: Feb. 26, 1979

[30] Foreign Application Priority Data

Apr. 24, 1978 [JP] Japan ................................. 53-20522

[51] Int. Cl.³ .............................................. H01B 1/04
[52] U.S. Cl. .................... 252/503; 252/506; 252/507; 252/511; 252/512; 252/513; 252/514; 252/518; 252/519; 252/520; 338/114
[58] Field of Search .............. 252/503, 506, 507, 511, 252/512, 513, 514, 518, 519, 520; 338/114; 260/37 SB, 37 R, 37 M, 37 N, 37 AL, 42.32, 42.33

[56] References Cited

U.S. PATENT DOCUMENTS

| | | | |
|---|---|---|---|
| 4,028,276 | 6/1977 | Harden et al. | 252/511 |
| 4,138,369 | 2/1979 | Arai et al. | 252/512 |
| 4,138,369 | 2/1979 | Arai et al. | 252/512 |
| 4,152,304 | 5/1979 | Tadewald | 252/506 |

FOREIGN PATENT DOCUMENTS 6514033  3/1966  Netherlands ....................... 252/503

*Primary Examiner*—J. L. Barr
*Attorney, Agent, or Firm*—Wyatt, Gerber, Shoup, Scobey & Badie

[57] ABSTRACT

A pressure sensitive conductor consists essentially of (I) an electrically insulating rubber (excluding addition reaction type liquid silicone rubber), (II) 25 to 50% by volume of electrically conductive metal particles (preferably 40 to 200μ in particle size) and (III) 5 to 20% by volume of carbon black, and having a JIS A hardness of at least 40. Said conductor may optionally contain (IV) 0.1 to 5% by volume of a mono-, di- or trialkyl titanate. This pressure sensitive conductor has high mechanical strength, a rapid electrical response to deformations, a low hysteresis of the electrical resistance variation on application and release of pressure, and minimized change of the pressure-resistivity curve under repeated deformations.

11 Claims, 1 Drawing Figure

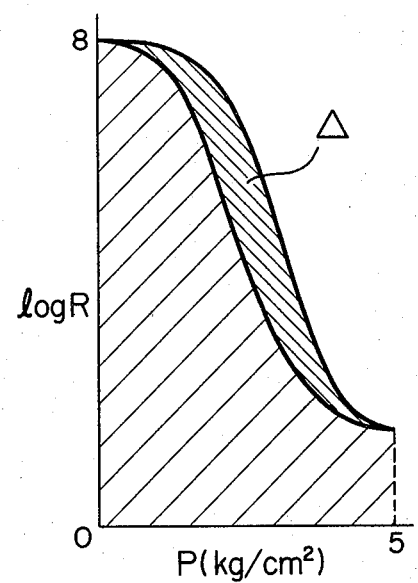

PRESSURE SENSITIVE CONDUCTOR

BACKGROUND OF THE INVENTION

1. Field of the Invention

This invention relates to pressure sensitive conductors (pressure sensitive conductive rubbers) which have high mechanical strength, rapid response to electrical deformations, low hysteresis of the electrical resistance variation on application and release of pressure and very limited variation of the pressure-resistivity curve under repeated deformations.

The term "pressure sensitive conductors" is used in this application to refer to the rubber-like resistors or conductors whose volume resistivity (Ω·cm) varies in the order of three digits or more when pressure is applied thereto.

2. Description of the Prior Art

It is known that composite products obtained by mixing conductive metal particles in an elastomer and then molding and cross-linking the mixture can provide a pressure sensitive conductor whose volume resistivity is greatly varied when the conductor is deformed.

Nevertheless, there are very few pressure sensitive conductors utilized on an industrial scale. The unfavorable reception of such conductors by industry has been attributed to their unfortunate tendency to change their resistance under no load constitions, their unsatisfactory overall electrical properties and their poor mechanical strength or durability.

Most pressure sensitive conductors containing metal can stand only approximately 100,000 repetitions of use. Undesirable hysteresis phenomena and changes in electrical properties take place as the number of times of use increases. As a result pressure sensitive conductors are still unsatisfactory in respect of reliability and continuous efficiency.

It is known that conductive rubber can be obtained by blending conductive carbon black with a solid rubber such as silicone rubber or the like and then molding and cross-linking the blend. This conductive rubber is widely utilized for switch elements and in other applications. However, the mixture of rubber and conductive carbon black can not function as a pressure sensitive conductor which is substantially an insulator when no pressure is applied and becomes conductive only with the application of pressure. It is known that pressure sensitive conductors obtained from such carbon black-rubber blends alone show a volume resistivity (Ω·cm) change in the order of only about two digits on application of pressure.

Dutch Patent Application No. 65-14033 discloses an electrical conductor produced by dispersing carbon black and conductive metal particles in a rubber, but this product is not a pressure sensitive conductor of this invention because the quantity of the conductive metal particles is too low and the carbon black is too high.

SUMMARY OF THE INVENTION

The pressure sensitive conductors of this invention manifest high mechanical stength rapid response to pressure (the electrical resistance changes within 1 milliseconds after the application of pressure), low hysteresis of the electrical resistance variation due to application and release of pressure and minimum change in the pressure-resistivity curve even under repeated deformations. It has been found that the object can be attained by blending the particles of a conductive metal and carbon black in specific proportions with an electrically insulating rubber.

According to this invention, there are provided a pressure sensitive conductors containing (I) an electrically insulating rubber, (II) 25 to 50% by volume, based on the volume conductor, of the particles of a conductive metal, and (III) 5 to 20% by volume, based on the volume of the conductor, of carbon black, which has a JIS A hardness of 40 or more.

BRIEF DESCRIPTION OF THE DRAWINGS

The accompanying drawings are a graphic illustration of the method of determining the hysteresis (%) in Example 1 which appears hereinafter.

DETAILED DESCRIPTION OF THE INVENTION

Typical electrically insulating rubbers which may be used in this invention, include natural rubber, polybutadiene rubber, polyisoprene rubber, styrenebutadiene, copolymer rubber, ethylene-propylene copolymer rubber (EPM), ethylene-propylene-diene copolymer rubber (EPDM), silicone rubber, polyurethane rubber, butyl rubber, acrylonitrile-butadiene copolymer rubber, acrylic rubber, chloroprene rubber, etc. The presently preferred rubbers are ethylene-propylene copolymer rubber, ethylenepropylene-diene copolymer rubber, silicone rubber, polyurethane rubber and butyl rubber pressure of their good electrical properties and high heat resistance. For optimum mechanical strength and heat resistance, it is preferable to use rubbers cross-linked with sulfur, a sulfur compound or a peroxide. These rubbers may be used in combination of two or more. The addition reaction type liquid silicone rubbers can not be used in the products of this invention because cross-linking reaction (addition reaction) does not take place when such silicone rubbers are mixed with sufficient amounts of carbon black, graphite or the like to impart useful conductivity to the rubber with the result that molded articles cannot be produced.

The amount of the conductive metal particles used in this invention is critical and ranges from 25 to 50% by volume based on the volume of the pressure sensitive conductor. If the metal particles are mixed in an amount exceeding 50% by volume, the specific gravity of the product becomes too great and the mechanical strength becomes too low though a pressure sensitive conductor could be obtained under certain conditions. On the other hand, if the amount of the conductive metal particles is less than 25% by volume, the conductivity of the mixture when pressure is applied is too low to use the product as a pressure sensitive conductor. Considering the mechanical and electrical characteristics of the pressure sensitive conductor obtained, the amount of the conductive metal perticles used is preferably 25 to 40% by volume, more preferably 25 to 30% by volume.

The conductive metal particles used in this invention are those commonly employed in the art, such as silver, copper, cobalt, platinum, gold, nickel, chromium, iron, titanium, zinc, and alloys and oxides thereof, and these materials may be used either alone or in combination. From the viewpoint of stability against oxidation and cost, it is preferred to use silver, copper, nickel, cobalt, chromium, iron or alloys thereof. Particles of silver, copper, nickel and alloys thereof are most preferable.

The size of the conductive metal particles used in this invention is preferably within the range of 0.1 to 200μ, and it is more preferable to use the particles with a size of 1μ or more because of improved resistance to oxidation. The most preferred are particles having a size of 40μ or more because of optimum viscosity and processability of the mixture of rubber, carbon black and conductive metal particles. A particle size of more than 200μ is undesirable because such particle tend to separate from the pressure sensitive conductor. Particularly preferred are particles having a particle size of more than 100μ but not more than 120μ.

The pressure sensitive conductors obtained according to this invention will withstand more than 100,000 repetitions of use even when not the specific conductive metal particles but the general purpose conductive metal particles are used, and surprisingly, it has been found that the hysteresis phenomenon of resistivity variation due to application and release of pressure is changed only within the range of error in measurement even after applying pressure 100,000 times.

The amount of carbon black used in the products of this invention is restricted to the range of 5 to 20% by volume based on the volume of the pressure sensitive conductor. If the amount of carbon black exceeds 20% by volume, the product tends to become a mere conductive rubber which is inferior in performance as a pressure sensitive conductor. Particularly when conductive carbon black is used in excess of 20% by volume, the product becomes a conductive rubber. On the other hand, when the amount of carbon black is less than 5% by volume the durability of the obtained pressure sensitive conductor becomes poor and the JIS A hardness of the cross-linked composition is often less than 40. Further, the product is low in mechanical strength.

The carbon black used in this invention is not limited to any specific type. channel black, furnace black, thermal black, etc. Carbon black of the channel black type or furnace black type is preferable because the mechanical strength and hardness of the product are enhanced and the difference between the resistivity of the pressure sensitive conductor when pressure is applied and that when no pressure is applied becomes great.

In the present invention, when a mono-, di- or trialkyl titanate is added to the said three-component composition in an amount of 0.1 to 5% by volume based on the volume of the pressure sensitive conductor, mixing of the components and molding of the composition become easy and the deterioration of mechanical properties and the hysteresis of resistivity variation on application and release of pressure are decreased the production of a high performance, resulting in pressure sensitive conductor.

The monoalkyl titanates used in this invention are represented by the following formulae:

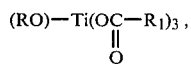

(RO)-Ti(OR$_2$)$_3$ and (RO)-Ti(OXR$_2$)$_3$, in which R is an alkyl group having 1 to 4 carbon atoms, R$_1$ is a vinyl group, an α-alkyl-substituted vinyl group, an alkyl, aralkyl or aryl group having 6 to 20 carbon atoms or a derivative thereof, R$_2$ is an alkyl, aralkyl or aryl group having 6 to 20 carbon atoms, or a derivative thereof and X is

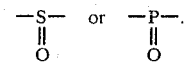

The dialkyl and trialkyl titanates used in this invention are represented by the following formula: $(RO)_n\text{-}Ti(OR')_{4-n}$ where n is 2 or 3, and R is an alkyl group, preferably having 1 to 4 carbon atoms because of good reactivity and other favorable properties. The ligands (R'O—) other than alkoxy (RO) are required to be less hydrolyzable than the alkoxy-titanium bond. In the above formula, R' may be a triethanolamine residue, an acyl group, an alkylbenzenesulfonyl group, an alkyl group having 6 to 20 carbon atoms, preferably 10 to 20 carbon atoms, or a derivative thereof.

Typically useful titanates include as said titanates, isopropyl triisostearoyl titanate, isopropyl trilauryl titanate, isopropyl trimyristyl titanate, isopropyl dimethacryloyl isostearoyl titanate, isopropyl tri(dodecylbenzenesulfonyl) titanate, isopropyl isostearoyl diacryloyl titanate, isopropyl tri(diisooctylphosphate) titanate, isopropyl trimethacryloyl titanate, isopropyl tri(dioctylpyrophosphate) titanate, isopropyl triacryloyl titanate, isopropyl tri(dioctylphosphite) titanate, butyl triisostearoyl titanate, ethyl triisostearoyl titanate, bis(triethanolamine)diisopropyl titanate, bis(triethanolamine)-dibutyl titanate, bis(triethanolamine)diethyl titanate. bis(triethanolamine)dimethyl titanate, diisopropyldilauryl titanate, diisopropyl lauryl myristyl titanate, diisopropyl distearoyl titanate, diisopropyl stearoylmethacryloyl titanate, diisopropyl diacryloyl titanate, diisopropyl didodecylbenzenesulfonyl titanate, diisopropyl isostearyol-4-aminobenzoyl titanate, triisopropyl acryloyl titanate, triethyl methacryloyl titanate, triisopropyl myristyl titanate, tributyl dodecylbenzenesulfonyl titanate, triisopropyl stearoyl titanate, triisopropyl isostearoyl titanate, and the like.

The pressure sensitive conductors of this invention will have a JIS A hardness of 40 or more, preferably 50 or more, as measured according to JIS K 6301. If the conductor hardness is less than 40, concentration of stress from the outside tends to occur when the conductor is used for a switch element or such, and in certain extreme cases, the conductor may be broken dynamically even before it becomes electrically useless due to concentration of stress from the outside.

Although the hardness of the pressure sensitive conductor of this invention may be adjusted by varying the proportions of the constituents, it is generally adjusted by controlling the cross-linking temperature and time.

The products of this invention may, optionally contain the additives miscible with rubber, such as extender oil, processing oil, fillers other than the conductive metal particles and carbon black, anti-oxidant, cross-linking agent, cross-linking promotor, etc., and these additives are calculated as rubber component in the determination of the volume percentages of the conductive metal powder and carbon black.

For a further description of this invention, there are given hereinbelow the working examples of the invention, but it is to be understood that these examples are merely intended to be illustrative and not restrictive to the scope of the invention.

EXAMPLES 1 to 5 and COMPARATIVE EXAMPLES 1 and 2

In order to show the salient effect of this invention, there were prepared and compared pressure sensitive conductors composed principally of a rubber, carbon black and conductive metal particles (Examples 1 to 5), a pressure sensitive conductor composed principally of a rubber and carbon black (Comparative Example 1) and a pressure sensitive conductor composed principally of a rubber and conductive metal particles (Comparative Example 2).

According to the blending prescription shown in Table 1, the components were mixed and formed into a uniform, 1-mm thick sheet by using a Banbury mixer for test and 4-inch rolls, and this sheet was held between molds and cured at 160° C. for 30 minutes. Care was taken so that the same mixing and molding conditions were used in Examples 1 to 5 and Comparative Examples 1 and 2.

The properties of each of the thus prepared specimens were measured according to JIS K 6301 and shown in Table 2. As seen from Table 2, Comparative Example 1 could not provide a pressure sensitive conductor. In Comparative Example 2, the number of repetitions of use was approximately $2 \times 10^4$, and hence, the difference thereof from approximately $10^5$–$10^6$ in Examples 1 to 5 was about $10^1$–$10^2$. Also, in Examples 1 to 5, the hysteresis of electrical resistance by application and release of pressure was up to 9.5% and it remained at this level even after pressure was repeatedly applied $10^6$ times.

TABLE 1

Blending prescription in Examples 1 to 5 and Comparative Examples 1 and 2

| | Example 1 | | Example 2 | | Example 3 | | Example 4 | |
|---|---|---|---|---|---|---|---|---|
| | Part by wt. | % by vol. | Part by wt. | % by vol. | Part by wt. | % by vol. | Part by wt. | % by vol. |
| EPDM[1] | 100 | | 100 | | 100 | | 100 | |
| Tetramethylthiuram disulfide | 0.5 | | 0.5 | | 0.5 | | 0.5 | |
| Stearic acid | 2 | | 2 | | 2 | | 2 | |
| 2-Mercaptobenzothiazole | 2 | 65.0 | 2 | 65.0 | 2 | 65.0 | 2 | 65.0 |
| Zinc dimethylthiocarbamate | 1 | | 1 | | 1 | | 1 | |
| Sulfur | 1 | | 1 | | 1 | | 1 | |
| Paraffinic processing oil | 10 | | 10 | | 10 | | 10 | |
| Zinc white | 5 | | 5 | | 5 | | 5 | |
| Nickel particle[2] | 500 | 28.1 | 500 | 28.1 | 500 | 28.1 | 500 | 28.1 |
| Particle size of nickel particle (μ) | 20–40 | — | 40 | — | 70 | — | 100–120 | — |
| Carbon black[3] | 25 | 6.9 | 25 | 6.9 | 25 | 6.9 | 25 | 6.9 |

| | Example 5 | | Comp. Example 1 | | Comp. Example 2 | |
|---|---|---|---|---|---|---|
| | Part by wt. | % by vol. | Part by wt. | % by vol. | Part by wt. | % by vol. |
| EPDM[1] | 100 | | 100 | | 100 | |
| Tetramethylthiuram disulfide | 0.5 | | 0.5 | | 0.5 | |
| Stearic acid | 2 | | 2 | | 2 | |
| 2-Mercaptobenzothiazole | 2 | 65.0 | 2 | 74.5 | 2 | 67.7 |
| Zinc dimethylthiocarbamate | 1 | | 1 | | 1 | |
| Sulfur | 1 | | 1 | | 1 | |
| Paraffinic processing oil | 10 | | 10 | | 10 | |
| Zinc white | 5 | | 5 | | 5 | |
| Nickel particle[2] | 500 | 28.1 | — | — | 550 | 32.3 |
| Particle size of nickel particle (μ) | 150–200 | — | — | — | 100–120 | — |
| Carbon black[3] | 25 | 6.9 | 80 | 25.5 | — | — |

Note:
[1] Mooney viscosity $ML_{1+4}$ (100° C.): 38, termonomer: ENB, iodine number: 38
[2] HAF black.

TABLE 2

Results of measurement in Examples 1 to 5 and Comparative Examples 1 and 2

| | Example 1 | Example 2 | Example 3 | Example 4 | Example 5 | Comp. Example 1 | Comp. Example 2 |
|---|---|---|---|---|---|---|---|
| Tensile strength (kg/cm$^2$) | 146 | 141 | 135 | 130 | 109 | 190 | 70 |
| Hardness (JIS A) | 61 | 65 | 66 | 65 | 69 | 82 | 60 |
| Hystersis[1] (%) | 4.5 | 4 | 6 | 5 | 9.5 | — | 13 |
| Resistivity under no pressure[2] (Ω) | $10^7$ or more | $10^7$ or more | $10^7$ or more | $10^7$ or more | $10^7$ or more | $10^{4.5}$ | $10^7$ or more |
| Resistivity under pressure[3] (Ω) | $10^{3.4}$ | $10^{2.7}$ | $10^{2.0}$ | $10^{1.5}$ | $10^{0.9}$ | $10^{4.2}$ | $10^2$ |

TABLE 2-continued

Results of measurement in Examples 1 to 5 and Comparative Examples 1 and 2

|  | Example 1 | Example 2 | Example 3 | Example 4 | Example 5 | Comp. Example 1 | Comp. Example 2 |
|---|---|---|---|---|---|---|---|
| Number of use repetitions[4] | $4 \times 10^5$ | $1 \times 10^6$ | $1 \times 10^6$ | $2 \times 10^6$ or more | $1.5 \times 10^5$ | — | $12 \times 10^4$ |

Note:
[1] A circular specimen of 10 mmφ in diameter was cut out of a 1.0 mm thick sheet and pressure (P) (in terms of kg/cm$^2$ unit) was applied to the specimen, measuring resistivity (R) across the upper and lower sides of the speciment 30 seconds after pressure application. Pressure was changed from 0 to 5 kg/cm$^2$ and from 5 to 0 kg/cm$^2$ gradually, 100 g/cm$^2$ at a time, drawing a log R - P curve as shown as an example in the accompanying drawings, and the hysteresis (%) was determined from the ratio of the area of the shadowed portion to Δ. This was applied only where the variation of log R was in the order of three or more digits.
[2] The shape of the specimens and the measuring method used are the same as described in Note 1.
[3] Measured 30 seconds after application of 5 kg/cm$^2$ of pressure to the specimen of Note 1.
[4] Pressure (changing from 0 to 5 kg/cm$^2$ and from 5 to 0 kg/cm$^2$) was applied repeatedly at a rate of 5 Hz while measuring resistivity across the upper and lower sides of the specimen of Note 1, determining the lowest resistivity, and when the lowest resistivity has become higher than 2 KΩ, the specimen was judged unfit for use any more. A 5 V constant-voltage power source was used.

EXAMPLES 6 to 10 and COMPARATIVE EXAMPLES 3 and 4

In order to learn the effect of the conductive metal particle loading in this invention, tests were conducted by varying the amount of the nickel particles (40μ size) blended while keeping the amount of carbon black constant.

The components were blended as shown in Table 3 and then molded and cross-linked in the same manner as in Example 1. The properties of the obtained products were determined in the same way as in Example 1, obtaining the results shown in Table 4. When the amount of the conductive metal particles was less than 25% by volume as in Comparative Example 4, no satisfactory pressure sensitive conductor was obtained even if the carbon black content was increased. When the amount of the conductive metal particles was more than 50% by volume, the resistivity under no pressure was small.

EXAMPLES 11 to 13 and COMPARATIVE EXAMPLES 5 and 6

For determining the effect of the carbon black loading in this invention, the amount of the channel carbon black blended was varied while fixing the content of the conductive metal particles. The components were blended according to the prescription of Table 5, then molded and cross-linked, and the properties of the obtained sheets were determined, all by following the procedures of Example 1. The results obtained are shown in Table 6.

It is seen from Table 6 that the product of Comparative Example 5, which contained no carbon black is inferior to the products of Examples 11 to 13 in the number of repetitions of use which the product can stand, and that the product of Comparative Example 6 which has high carbon black loading becomes electrically conductive.

TABLE 3

Blending prescription in Examples 6 to 10 and Comparative Examples 3 and 4

|  | Example 6 | | Example 7 | | Example 8 | | Example 9 | |
|---|---|---|---|---|---|---|---|---|
|  | Part by wt. | % by vol. | Part by wt. | % by vol. | Part by wt. | % by vol. | Part by wt. | % by vol. |
| SBR[1] | 100 | } 64 | 100 | } 63 | 100 | } 59 | 100 | } 56 |
| Dicumyl peroxide | 2 | | 2 | | 2 | | 2 | |
| HAF carbon black | 30 | 10 | 30 | 9 | 30 | 9 | 30 | 8 |
| Nickel particle (40 μ) | 370 | 26 | 400 | 28 | 500 | 32 | 580 | 36 |

|  |  | Example 10 | | Comp. Example 3 | | Comp. Example 4 | |
|---|---|---|---|---|---|---|---|
|  |  | Part by wt. | % by vol. | Part by wt. | % by vol. | Part by wt. | % by vol. |
|  | SBR[1] | 100 | } 50 | 100 | } 42 | 100 | } 61 |
|  | Dicumyl peroxide | 2 | | 2 | | 2 | |
|  | HAF carbon black | 30 | 7 | 30 | 6 | 50 | 15 |
|  | Nickel particle (40 μ) | 780 | 43 | 1100 | 52 | 359 | 24 |

Note:
[1] Cold non-oil-extended SBR having a bonded styrene content of 23.5% and a Mooney viscosity $ML_{1+4}$ (100° C.) of 52.

TABLE 4

Results of measurement in Examples 6 to 10 and Comparative Examples 3 and 4

|  | Example 6 | Example 7 | Example 8 | Example 9 | Example 10 | Comp. Example 3 | Comp. Example 4 |
|---|---|---|---|---|---|---|---|
| Nickel particle (% by vol.) | 26 | 28 | 32 | 36 | 43 | 52 | 24 |
| Tensile strength (kg/cm$^2$) | 110 | 110 | 97 | 80 | 70 | 55 | 120 |
| Hardness (JIS A) | 60 | 60 | 63 | 65 | 70 | 77 | 56 |
| Hysteresis[1] (%) | 6 | 6 | 4 | 4 | 7 | — | — |
| Resistivity under no pressure (Ω) | $10^7$ or more | $10^7$ or more | $10^7$ or more | $10^7$ or more | $10^6$ | $10^{1.5}$ | $10^7$ or more |
| Resistivity under pressure[1] (Ω) | $10^2$ | $10^2$ | $10^0$ | $10^{-0.8}$ | $10^{-1}$ | $10^{-1.2}$ | $10^5$ |
| Number of use repetitions | $2 \times 10^5$ | $2 \times 10^5$ | $4 \times 10^6$ | $3 \times 10^6$ | $3 \times 10^6$ | — | — |

Note:
[1] The method of Example 1 was used by applying 10 kg/cm$^2$ of pressure instead of 5 kg/cm$^2$.

TABLE 5
Blending prescriptions in Examples 11-13 and Comparative Examples 5 and 6

|  | Example 11 | | Example 12 | | Example 13 | | Comp. Example 5 | | Comp. Example 6 | |
| --- | --- | --- | --- | --- | --- | --- | --- | --- | --- | --- |
|  | Part by wt. | % by vol. | Part by wt. | % by vol. | Part by wt. | % by vol. | Part by wt. | % by vol. | Part by wt. | % by vol. |
| Silicone rubber[1] | 100 | } 47 | 100 | } 45 | 100 | } 40 | 100 | } 53 | 100 | } 37 |
| Dicumyl peroxide | 0.8 | | 0.8 | | 0.8 | | 0.8 | | 0.8 | |
| Reduced copper particle[2] | 836 | 48 | 836 | 45 | 836 | 40 | 796 | 47 | 836 | 38 |
| Carbon black | 17.6 | 5 | 37.2 | 10 | 83.7 | 20 | — | — | 110 | 25 |

Note
[1] Methylvinylsilicone rubber
Note
[2] Having a particle size of 200 μ.

TABLE 6
Results of measurement in Examples 11 to 13 and Comparative Examples 5 and 6

|  | Example 11 | Example 12 | Example 13 | Comp. Example 5 | Comp. Example 6 |
| --- | --- | --- | --- | --- | --- |
| Carbon black (% by volume) | 5 | 10 | 20 | 0 | 25 |
| Tensile strength (kg/cm$^2$) | 20 | 35 | 38 | 12 | 50 |
| Hardness (JIS A) | 76 | 81 | 92 | 73 | 98 |
| Hysteresis (%) | 5 | 4 | 5 | 6 | — |
| Resistivity under no pressure (Ω) | $10^7$ | $10^6$ | $10^{4.5}$ | $10^7$ or more | $10^{0.6}$ |
| Resistivity under pressure (Ω) | $10^{1.5}$ | $10^{1.2}$ | $10^{0.8}$ | $10^2$ | $10^{0.3}$ |
| Number of use repetitions | $10^6$ or more | $10^6$ or more | $10^6$ or more | $3 \times 10^5$ | — |

EXAMPLES 14 to 17

As will be appreciated from Examples 1 to 13, it is possible with this invention to obtain an excellent pressure sensitive conductor without addition of any titanate compound, but addition of a titanate compound contributes to the improvement of the product properties. In order to determine the effect of addition of the titanate compounds, the components were blended according to the prescription of Table 7 by changing the kind of the titanate compound added and the compositions were molded and cross-linked in the same manner as in Example 1 to obtain the sheets. The properties of each of the thus obtained sheets were measured in the same manner as in Example 1, obtaining the results shown in Table 8.

It is noted that the product properties are further improved by addition of a mono-, di- or trialkyl titanate. It should be also noted that addition of said titanate compounds can facilitate uniform mixing of the components owing to a decrease in the composition viscosity, resulting in a more uniform surface of the products.

TABLE 7
Blending prescription in Examples 14 to 17

|  | Examples 14 to 17 | |
| --- | --- | --- |
|  | Part by wt. | % by volume |
| EPDM[1] | 100 | |
| Dicumyl peroxide | 2 | } 62.5 |
| Titanate compound[3] | 9 | |
| Silver particles[2] | 608 | 32.0 |
| XCF carbon | 18 | 5.5 |

Note:
[1] Mooney viscosity $ML_{1+4}$ (100° C.): 90, terminomer: ENB, iodine number: 15
[2] Approximately 70–100μ in particle size.
[3] Example 14 - Isopropyl triisostearoyl titanate
Example 15 - Bis(triethanolamine)diisopropyl titanate
Example 16 - Triisopropyl acryloyl titanate
Example 17 - No addition of titanate compound

TABLE 8
Results of measurement in Examples 14 to 17

|  | Example 14 | Example 15 | Example 16 | Example 17 |
| --- | --- | --- | --- | --- |
| Tensile strength (kg/cm$^2$) | 75 | 80 | 75 | 65 |
| Hardness (JIS A) | 65 | 65 | 65 | 67 |
| Hysteresis (%) | 3 | 3 | 3 | 4 |
| Resistivity under no pressure (Ω) | $10^7$ or more | $10^7$ or more | $10^7$ or more | $10^7$ or more |
| Resistivity under pressure (Ω) | $10^{-1.2}$ | $10^{-1.2}$ | $10^{-1.2}$ | $10^{-1.0}$ |
| Number of use repetitions | $1 \times 10^6$ | $3 \times 10^6$ | $1 \times 10^6$ | $6 \times 10^5$ |

EXAMPLE 18

In order to learn the relation between the JIS A hardness of the pressure sensitive conductor and the variation of the pressure-resistivity curve as observed when pressure is applied repeatedly to the conductor, the components were mixed according to Table 9, molded and cross-linked in the same way as in Example 1 to obtain the sheets, and the properties of each of the thus obtained sheets were determined in the same manner as in Example 1. The results obtained are shown in Table 10.

As seen from Table 10, the number of repetitions of use differs greatly between the product with a hardness of less than 40 and the product with a hardness of 40 or more. A particularly wide difference is seen when pressure is applied by using a rod. This is considered attributable to the fact that a pressure sensitive conductor with a low hardness has a greater tendency to induce stress concentration than one having high hardness if they are subjected to the same degree of pressure.

TABLE 9

Blending prescription in Examples 4 and 18 and Comparative Example 7

|  | Example 4 | | Example 18 | | Comp. Example 7 | |
| --- | --- | --- | --- | --- | --- | --- |
|  | Part by wt. | % by vol. | Part by wt. | % by vol. | Part by wt. | % by vol. |
| EPDM[3] | 100 |  | 100 |  | 100 |  |
| Tetramethylthiuram disulfide | 0.5 |  | 0.5 |  | 0.5 |  |
| Stearic acid | 2 |  | 2 |  | 2 |  |
| 2-Mercaptobenzothiazole | 2 |  | 2 |  | 2 |  |
| Zinc dimethyldithiocarbamate | 1 | 65.0 | 1 | 66.6 | 1 | 62.4 |
| Sulfur | 1 |  | 1 |  | 1 |  |
| Paraffinic processing oil | 10 |  | 50 |  | 100 |  |
| Zinc white | 5 |  | 5 |  | 5 |  |
| Nickel particles[1] | 500 | 28.1 | 656 | 28.1 | 1040 | 31.7 |
| Carbon black[2] | 25 | 6.9 | 25 | 5.3 | 40 | 5.9 |

Note:
[1] 100–120 μ in size.
[2] HAF black.
[3] The same as in Example 1

TABLE 10

Results of measurement in Examples 4 and 18 and Comparative Example 7

|  | Example 4 | Example 18 | Comp. Example 7 |
| --- | --- | --- | --- |
| Tensile strength (kg/cm$^2$) | 130 | 80 | 60 |
| Hardness (JIS A) | 65 | 47 | 38 |
| Hysteresis (%) | 5 | 7 | 12 |
| Resistivity under no pressure (Ω) | $10^7$ or more | $10^7$ or more | $10^7$ or more |
| Resistivity under pressure (Ω) | $10^{1.5}$ | $10^2$ | $10^{1.2}$ |
| Number of use repetitions[1] | $2 \times 10^6$ or more | $2 \times 10^6$ or more | $4 \times 10^5$ |
| Number of use repetitions[2] | $3 \times 10^5$ | $2 \times 10^5$ | $2 \times 10^3$ |

Note:
[1] Measured by the method of Example 1.
[2] A force of 500 g was repeatedly applied to the pressure sensitive conductor by using a rod with a size of 4 mmφ at its end, and there was counted the number of repetitions of application of force until the resistivity between the rod and the underside of the conductor became 2 KΩ or the product became an electrical conductor. The measurement was made by using a constant-current and constant-voltage power source (5 V × 1 mA) at 5 Hz.

What is claimed is:

1. A pressure sensitive conductor comprising (I) an electrically insulating rubber, (II) 25 to 50% by volume, based on the volume of the pressure sensitive conductor, of particles of a conductive metal selected from the group consisting of silver, copper, cobalt, platinum, gold, nickel, iron, chromium, titatium, zinc, and alloys and oxides thereof, and (III) 5 to 20% by volume, based on the volume of the pressure sensitive conductor, of carbon black, said conductor having JIS A hardness of 40 or more said rubber being moldable in the presence of the carbon black.

2. A pressure sensitive conductor according to claim 1 further containing a monoalkyl titanate represented by the general formula: (RO)—

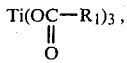

(RO)—Ti(OR$_2$)$_3$ or (RO)—Ti(OXR$_2$)$_3$ where R is an alkyl group having 1 to 4 carbon atoms, R$_1$ is a vinyl group, an α-alkyl-substituted vinyl group, an alkyl, aralkyl or aryl group having 6 to 20 carbon atoms, or a derivative thereof, R$_2$ is an alkyl, aralkyl or aryl group having 6 to 20 carbon atoms, or a derivative thereof, and X is

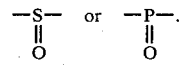

3. A pressure sensitive conductor according to claim 1 further containing a di- or tri-alkyl titanate represented by the general formula: (RO)$_n$Ti(OR')$_{4-n}$ where n is 2 or 3, R is an alkyl group and R' is a triethanolamine residue, an acyl or alkylbenzensufonyl group, or an alkyl group having 6 to 20 carbon atoms, or a derivative thereof.

4. A pressure sensitive conductor according to claim 1 further containing a component selected from the group consisting of isopropyl triisostearoyl titanate, isopropyl trilauryl titanate, isopropyl trimyristyl titanate, isopropyl isostearoyl dimethacryloyl titanate, isopropyl tri(dodecylbenzensulfonyl)titanate, isopropyl isostearoyl diacrylol titanate, isopropyl tri(diisooctylphosphate)titanate, isopropyl trimethacryloyl titanate, isopropyl tri(dioctylpyrophosphate)titanate, butyl triisostearoyl titanate, ethyl triisostearoyl titanate, bis(triethanolamine)diisopropyl titanate, bis(triethanolamine)dibutyl titanate, bis(triethanolamine)diethyl titanate, bis(triethanolamine)dimethyl titanate, diisopropyl dilauryl titanate, diisopropyl lauryl myristyl titanate, diisopropyl distearoyl titanate, diisopropyl stearoylmethacryloyl titanate, diisopropyl diacryloyl titanate, diisopropyl didodecylbenzensulfonyl titanate, diisopropyl isostearoyl-4-aminobenzoyl titanate, triisopropyl acryloyl titanate, triethyl methacryloyl titanate, triisopropyl myristyl titanate, tributyl dodecylbenzensulfonyl titanate, triisopropyl stearoyl titanate and triisopropyl isostearoyl titanate.

5. A pressure sensitive conductor according to coaim 1, 7, 3 or 4 wherein the component (I) is selected from the group consisting of natural rubber, polybutadiene rubber, polyisoprene rubber, styrene-butadiene copolymer rubber, ethylene-propylene copolymer rubber, ethylene-propylene-diene copolymer rubber, silicone rubber other than addition reaction type liquid silicone rubber, polyurethane rubber, butyl rubber, acrylonitrilebutadiene copolymer rubber, acrylic rubber and chloroprene rubber.

6. A pressure sensitive conductor according to claim 1, 2, 3, or 4 wherein the component (I) is selected from the group consisting of ethylene-propylene copolymer rubber, ethylene-propylene-diene copolymer rubber, silicone rubber other than addition reaction type liquid silicone rubber, polyurethane rubber and butyl rubber.

7. A pressure sensitive conductor according to claim 1, 2, 3 or 4 wherein the component (II) is particles of at least one member selected from the group consisting of silver, copper, cobalt, platinum, gold, nickel, iron, chromium, titanium, zinc and alloys and oxides of these metals.

8. A pressure sensitive conductor according to claim 1, 2, 3 or 4 wherein the component (II) is particles of at least one member selected from the group consisting of silver, copper, nickel, cobalt, chromium, iron and alloys thereof.

9. A pressure sensitive conductor according to claim 1, 2, 3 or 4 wherein the component (II) has a particle size of 0.1 to 200μ.

10. A pressure sensitive conductor according to claim 1, 2, 3 or 4 wherein the component (II) has a particle size of 40 to 200μ.

11. A pressure sensitive conductor according to claim 1, 2, 3 or 4 wherein the component (III) is channel black, furnace black or thermal black.

* * * * *